United States Patent [19]

Himmler

[11] 4,160,378
[45] Jul. 10, 1979

[54] TIRE TESTING MACHINE

[75] Inventor: Günther Himmler, Darmstadt, Fed. Rep. of Germany

[73] Assignee: Gebr. Hofmann G.m.b.H. & Co., KG, Maschinenfabrik, Darmstadt, Fed. Rep. of Germany

[21] Appl. No.: 909,187

[22] Filed: May 24, 1978

[30] Foreign Application Priority Data

Jun. 15, 1977 [DE] Fed. Rep. of Germany ....... 2726927

[51] Int. Cl.² .................. G01L 15/16; G01M 17/02
[52] U.S. Cl. .................................. 73/146; 73/133 R
[58] Field of Search ..................... 73/146, 8, 133 R

[56] References Cited

U.S. PATENT DOCUMENTS

| | | | |
|---|---|---|---|
| 3,152,468 | 10/1964 | Powell | 73/8 |
| 3,563,088 | 2/1971 | Sperberg | 73/146 |
| 3,864,967 | 2/1975 | Krenzel | 73/146 |
| 3,867,838 | 2/1975 | Gerresheim | 73/133 R |
| 4,023,404 | 5/1977 | Brendel | 73/133 X |
| 4,055,081 | 10/1977 | Honlinger | 73/146 |

FOREIGN PATENT DOCUMENTS

| | | | |
|---|---|---|---|
| 1648715 | 7/1971 | Fed. Rep. of Germany | 73/146 |
| 2104003 | 7/1973 | Fed. Rep. of Germany | 73/146 |
| 2217536 | 5/1974 | Fed. Rep. of Germany | 73/146 |
| 238831 | 7/1969 | U.S.S.R. | 73/133 R |

OTHER PUBLICATIONS

Publication, "Operational Amplifiers", by Tobey et al., pp. 270, 358-369, 428, (Burr-Brown), (1971).

Primary Examiner—Daniel M. Yasich
Attorney, Agent, or Firm—Cushman, Darby & Cushman

[57] ABSTRACT

A procedure and apparatus for determining the characteristic values of tires and rims and/or the attitude of the endurance limit of the same by rolling a wheel on a drum drive machine and measuring the forces and/or moments with a torque indicator. The measured forces are then transformed to the forces at the area of contact between the wheel and the drum. The forces applied to the wheel may then be readjusted by altering the slip angle, the camber angle and/or the contact pressure of the wheel on the drum.

9 Claims, 6 Drawing Figures

TIRE TESTING MACHINE

This invention relates to a procedure and apparatus for the determination of characteristic values of tires and rims and/or the attitude of the endurance limit of tires and rims by rolling a wheel on a cylinder machine, measuring the forces and/or moments with a torque indicator and releasing the loading according to a preset testing program.

Test apparatus are known e.g., in accordance with U.S. Pat. No. 3,867,838, for measuring parallel forces and/or moments at the measuring bridges by means of a torque indicator. With these tire testing machines, only components of the forces and/or moments, occurring as a result of the camber and slip, are determined by the measuring bridges.

In order to determine the characteristic values of tires and rims as well as the attitude of the endurance limit of tires and rims, the forces and moments at the contact area of the wheel must be determined. The user can correlate his observations of tire wear or failure with the forces and moments at the contact area. This is particularly important if the forces and/or moments are preset for a test-run and the parameters are changed, which vary, in turn, the actual force and/or moment values. Moreover, it is preferable that parameters affecting the tire can be changed during the course of the test run.

Signs of fatigue of the tire may occur which may necessitate an alteration in the actual loading at the contact area of the tire. In such a case, at least one of the parameters has to be readjusted so that the actual loading constantly matches the nominal preset loading.

Testing equipment in which loading can be preset is also generally known. In addition to the application cited above, we refer to the German Patent Application Nos. P 1648 715 and P 2217 536.

These testing and control apparatus do not teach a method of solving the special problems of tire testing machines caused by the structural conditions explained above.

One purpose of the present invention is to make available a procedure and equipment for the determination of the characteristic values of tires and rims and/or the attitude of the endurance limit of tires and rims whereby the actual loadings of the tire and/or rim are determined and a preset test loading is maintained.

This purpose is achieved, according to the invention, by observing the wheel under test while measuring, via a torque indicator, the forces and/or moments at the torque indicator and transforming these measurements onto the contact area of the tire so that the mutual influence of the slip angle and/or camber angle of the wheel on the actual forces and moments are taken into consideration. Also, the slip angle $\beta$ or the camber angle $\alpha$ of the wheel can be changed during testing without affecting the actual loading.

The loading of the lateral force is released after a chronological sequence according to the preferred procedure, at which time a readjustment of the camber angle or slip angle is effected.

At a further point in the procedure, the loading of the redress couple, $M_R$, is released, at which time the slip angle, $\beta$, is readjusted.

Then the loading of the camber moment, $M_S$, is released, at which time the camber angle, $\alpha$, is readjusted.

After a further suitable procedure the contact pressure of the wheel to the cylinder machine is readjusted.

The equipment, according to the invention, includes parallel steering means with which a wheel can be pivoted. The desired degree of pivoting can be stored on the one hand, with the chronological nominal loading values in test program storage means, or, on the other hand, with the actually determined loading of the contact area of the tire.

The pivoting motion is scanned by a suitable means via the aid of one or more pickups.

The equipment has a control unit, activated by a comparator, which carries out the alteration of the slip angle, camber angle and/or contact pressure.

These and other objects and advantages of the invention will become more apparent and more readily appreciated from the following detailed description of the presently preferred exemplary embodiment of the invention taken in conjunction with the accompanying drawings, of which:

Figure 1:
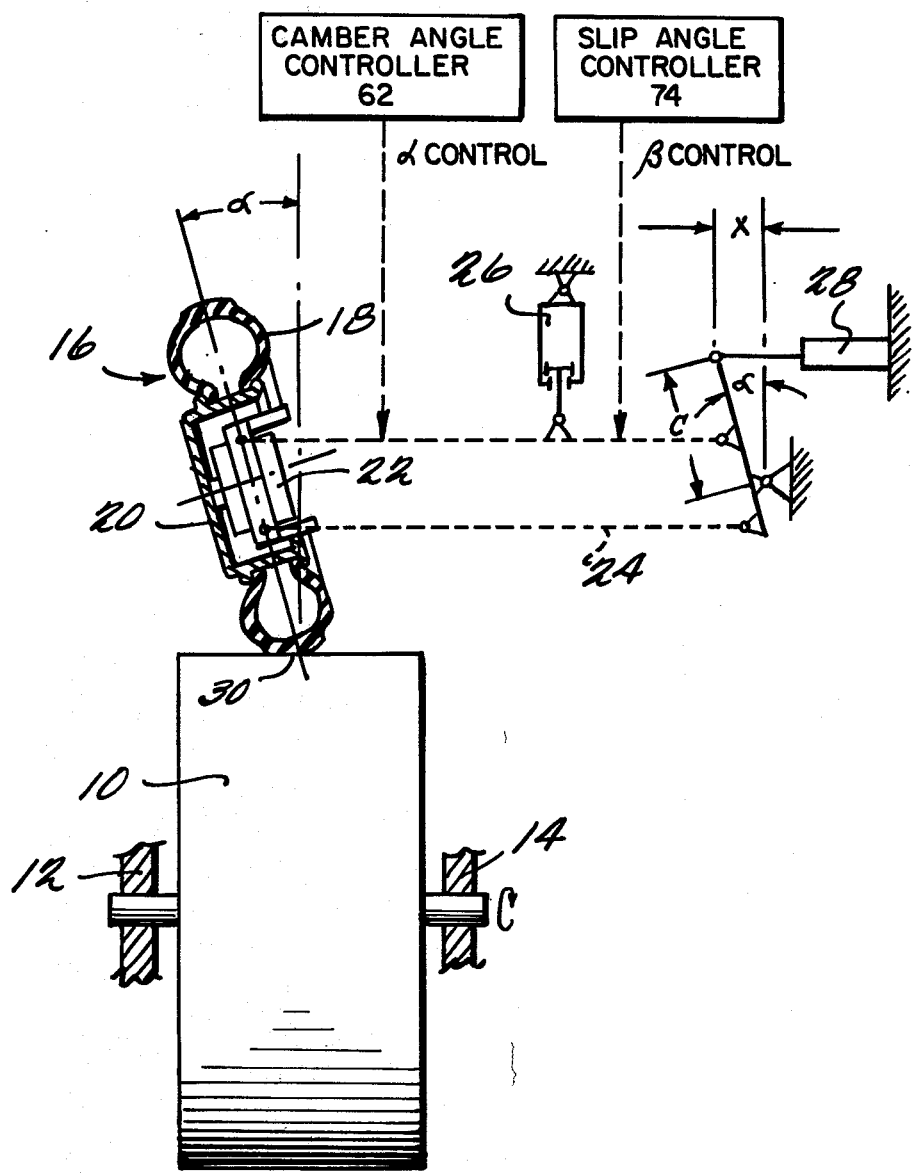
FIG. 1 shows schematically a tire testing unit whereby a camber is applied to the tire.

Referring now to FIG. 1, cylindrical drum 10 is pivoted about bearings 12 and 14 and can be rotated by any well known drive. Wheel 16 consisting of tire 18 and rim 20 is pressed against cylindrical drum 10. Torque indicator 22 is arranged in wheel 16 in order to determine the force of reaction during the rolling procedure of wheel 16 on cylindrical drum 10. Torque indicator 22 may be constructed in accordance with German Patent Application No. P 21 04 003. Torque indicators with one or more components can also be used.

Wheel 16, connected with torque indicator 22, is pivoted by the arrangement of parallel steering apparatus 24 so that a camber and/or slip angle can be applied. The pivoting may be effected by hydraulical, electrical or mechanical means.

Wheel 16 is pressed to cylindrical drum 10 via hydraulical equipment 26. Other pressure mechanisms can also be used.

Pickup 28 measures the distance X so that the camber angle, $\alpha$, can be determined according to the formula:

$$\text{Sin } \alpha = X/C$$

Figure 5:
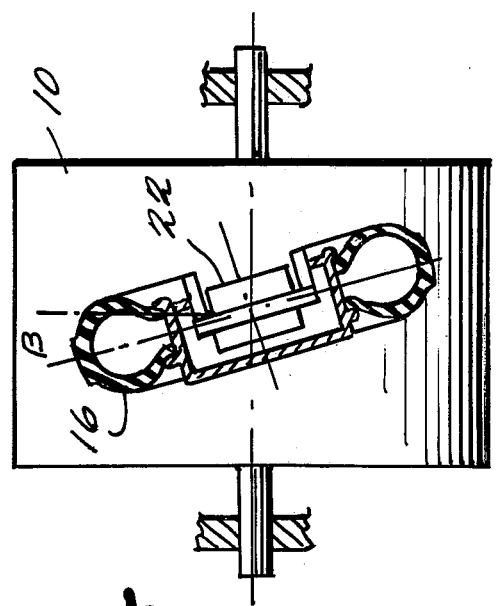
FIG. 5 shows schematically a tire testing stand whereby a slip is applied to the tire.

The determination of the slip angle $\beta$ (as illustrated in FIG. 5) is also logically effected.

The forces and moments measured may be transformed to the forces and pressures at the contact area of wheel 16 at a particular camber according to the following relations:

$$R = R_{gem} \cdot \cos \alpha - S_{gem} \cdot \sin \alpha.$$

$$S = S_{gem} \cdot \cos \alpha + R_{gem} \cdot \sin \alpha$$

$$M_R = S \cdot l_s - U \cdot l_n$$

$$M_S = M_{Sgem} + S_{gem} \cdot r_{dyn}$$

where:
- R = Vertical component of contact pressure applied to contact area 30 of wheel 16.
- S = Lateral component of force applied in the plane of contact of wheel 16.
- $R_{gem}$ = Component pressure of wheel 16 applied perpendicular to the axis of torque indicator 22.
- $S_{gem}$ = Component of lateral force applied parallel to the axis of torque indicator 22.
- $M_R$ = Redress couple, the reference axis of which is perpendicular to contact area 30 of wheel 16.
- $M_S$ = Camber with respect to contact area 30 of wheel 16.
- $r_{dyn}$ = Dynamic rolling radius.
- $l_s$ = Distance between the middle of wheel 16 and line of application of the lateral force in contact area 30 of wheel 16.
- $l_n$ = Distance between the middle of wheel 16 and line of application of the tangential force in contact area 30 of wheel 16.
- U = Peripheral force acting perpendicular to the axis of wheel 16.
- $M_{Sgem}$ = Camber with respect to the axis of torque indicator 22.

Figure 2:
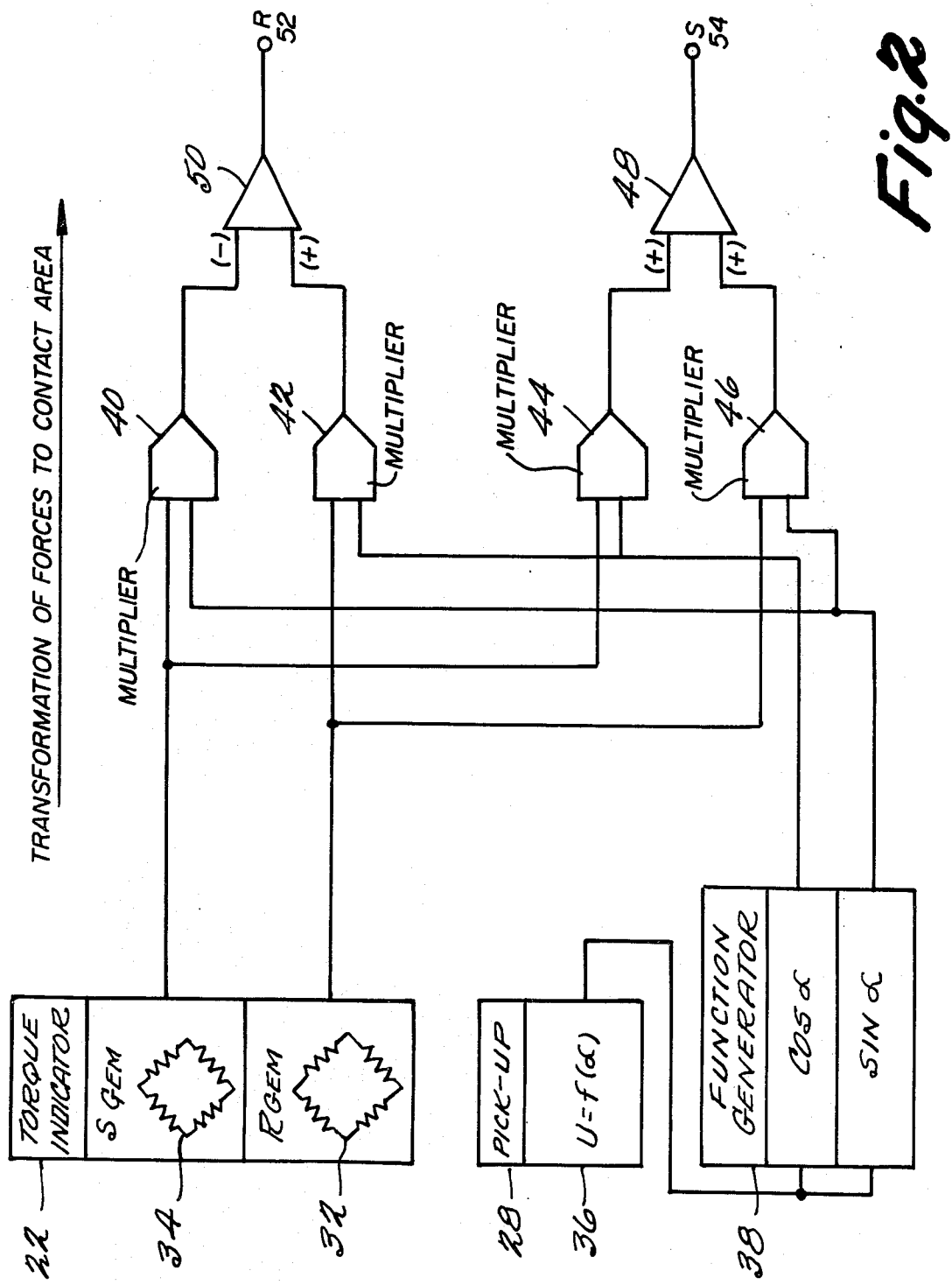
FIG. 2 shows the transformation of the forces measured with the torque indicator onto the contact area of the tire as a block wiring diagram.

FIG. 2 shows the switching arrangement for transformation of the values measured by torque indicator 22 onto the contact area 30.

The radial forces $R_{gem}$ and the lateral forces $S_{gem}$ are preferably measured by a twist strip chart via torque indicator 22 and are processed in measuring bridges 32 and 34 generating signals proportional to these forces.

The commands controlling the pivoting of parallel steering apparatus 24, determined by pickup 28 are stored in the storage 36 and fed into function generator 38 which produces signals related to cos α and sin α.

Subsequently, signals representing these the variables are applied as indicated in FIG. 2 to multipliers 40, 42, 44, and 46, and the resulting products are coupled to adder 48 producing a signal 54 representing the lateral force components and are coupled to subtracter 50 producing a signal 52 representing radial force component R at contact area 30.

The determination of the camber $M_S$ and the redress couple $M_R$ occurs in a very similar manner, based on the above equations, well known to those in the art.

Figure 3:
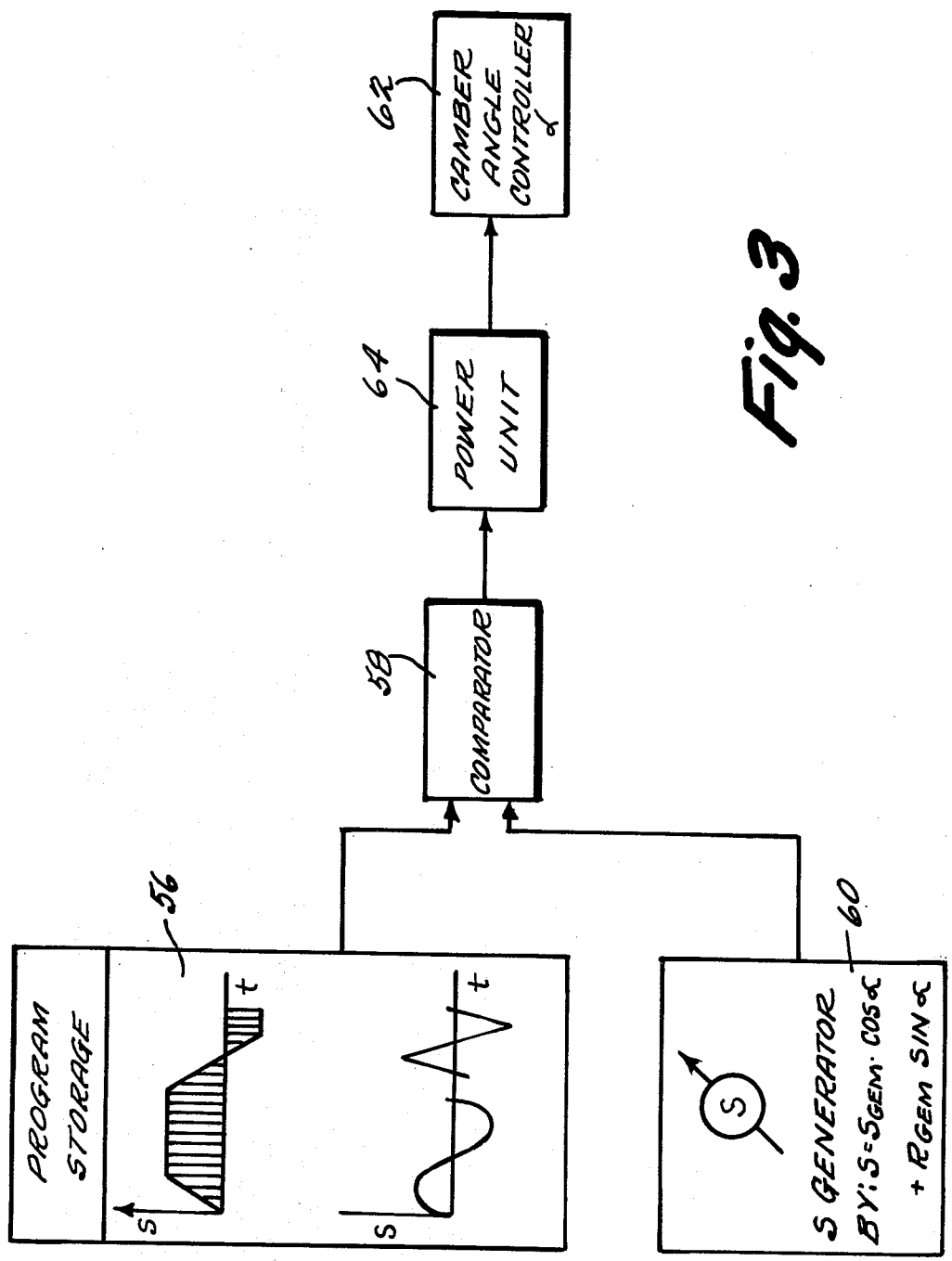
FIG. 3 shows the adjustment of the camber angle $\alpha$ as a function of a preset test program and the lateral components of the forces at the contact area.

FIG. 3 shows an automatic control system for a tire testing machine with which wheel 16 is loaded with lateral force S (t), predictably variable with time.

The test program S (t) is stored in storage means 56 and is supplied to comparator 58 which also is supplied with a signal representing the lateral force component S generated by means of circuit 60.

Comparator 58 compares the nominal value of the signal representing lateral force stored in storage means 56 with the signal representing actual value of the lateral force and controls the camber angle α via camber angle controller 62 by a power unit 64.

Figure 4:
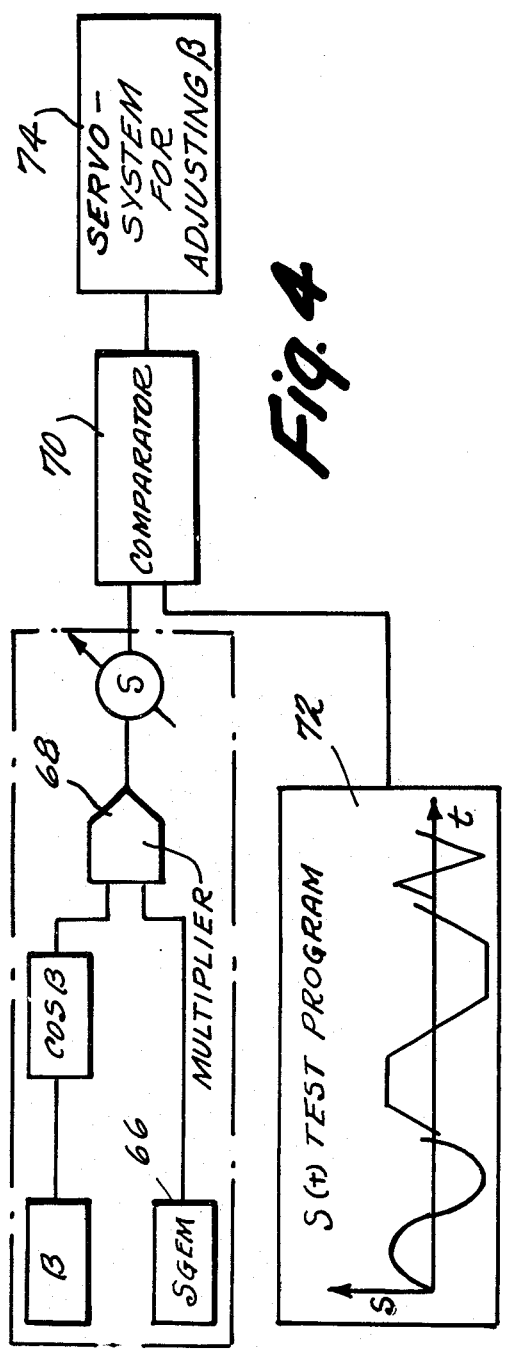
FIG. 4 shows the adjustment of the slip angle $\beta$ as a function of the lateral component A of the forces at the contact area and a preset test program.

FIGS. 4 and 5 show an automatic control system and a test stand for tire testing with which a wheel 16 is also loaded with a lateral force S (t) variable with time.

Figure 6:
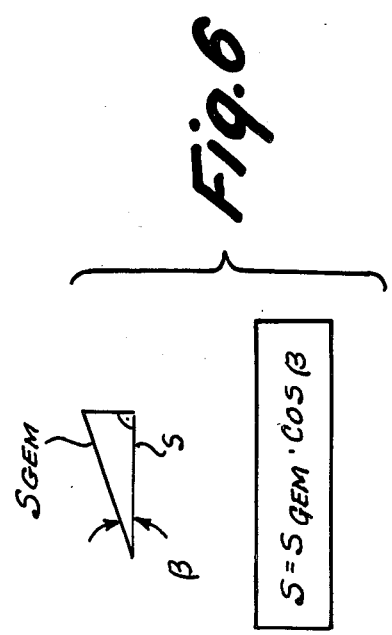
FIG. 6 shows the functional connection between lateral force measured in $S_{gem}$ and component force S at the contact area of the wheel.

The variation is effected via the slip angle β for this testing device. The values determined by torque indicator 22 and conducted to storage means 66. As indicated in FIGS. 4 and 6, circuit 68 multiplies with the cosine $S_{gem}$ of the angle β measured via a displacement pickup and are supplied to regulator 70 which also receives the nominal values of the lateral force S (t) from test program 72. comparator 70 compares nominal with actual value and controls the slip angle β via a servo system 74.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for the determination of characteristic values for tires and rims forming wheels and the attitude of the endurance limit of said tires and rims comprising the steps of:
    rolling said wheel about its axis on a cylindrical drum at a predetermined contact pressure between said wheel and said drum and at camber angle α and a slip angle β so as to generate forces at the contact area between said wheel and said drum said forces having lateral and vertical force components R and S and so as to generate a redress couple MR;
    measuring, with a torque indicator, rotational forces about said axis resulting from said rolling step;
    releasing said forces applied to said wheel according to a preset test program;
    transforming said measured forces into a set of forces at the contact area of said wheel with said cylinder, said transforming step taking into consideration the mutual influence of forces depending on at least one of the slip angle β, and the camber angle, α, of said wheel; and
    readjusting all of said forces by altering at least one of said slip angle, β, said camber angle, α, and the contact pressure of said wheel on said drum.

2. A method as in claim 1 wherein said releasing step releases said lateral force component S, in accordance with a chronological sequence, and said readjusting step alters one of and slip angle β, and said camber angle, α.

3. A method as in claim 1 wherein said releasing step releases said redress couple, $M_R$, in accordance with a chronological sequence, and said readjusting step alters said slip angle, β.

4. A method as in claim 1 wherein said releasing step releases said redress couple, $M_R$, in accordance with a chronological sequence, and said readjusting step alters said camber angle, α.

5. A method as in claim 1 wherein said readjusting step alters said contact pressure.

6. Apparatus for determining the characteristic values of tires and rims forming wheels and the attitude of the endurance limit of said tires and rims comprising:
    a cylindrical drum for rolling said wheel about its axis having means for pressing said wheel to said drum at a predetermined contact pressure between said wheel and said drum and at a camber angle α and slip angle β so as to generate forces at the contact area between said wheel and said drum, said forces having lateral nd vertical force components R and S and so as to generate a redress couple MR a torque indicator for producing first output signals related to said resulting forces;

steering means attached to said wheel for altering said slip and camber angles between said wheel and said drum;

means for storing a preset test program containing the nominal loading forces of said wheel as a function of time;

means for calculating the actual loading forces on at least one of said tire and rim from said first output signals;

a comparator for comparing said calculated actual loading forces with said nominal loading forces from said means for storing; and means responsive to said comparator for altering at least one of said contact pressure, slip angle $\beta$, or camber angle $\alpha$.

7. Apparatus as in claim 6 further including pickup means for measuring at least one of the slip angle and camber angle of said wheel.

8. Apparatus as in claim 6 wherein said altering means alters at least one of said camber angle, said slip angle and the contact pressure of said tire to said cylindrical drum.

9. Apparatus as in claim 7 further comprising:

function generating means for producing second output signals related to at least one of the sine and cosine of the angles measured by said pickup means;

multiplying means for producing third output signals related to the product of each of said first output signals and each of said second output signals;

means for adding and subtracting said third output signals to produce fourth output signals related to the radial and lateral forces in the contact area of said wheel.

* * * * *